Dec. 31, 1963 G. H. GOLDSTICK 3,116,476

MEMORY SENSING SYSTEM

Filed Feb. 26, 1962 4 Sheets-Sheet 1

INVENTOR:
Gerson H. Goldstick

By Louis A. Kline
John J. Matlago
Merwyn L. Young
His Attorneys

Dec. 31, 1963 G. H. GOLDSTICK 3,116,476

MEMORY SENSING SYSTEM

Filed Feb. 26, 1962 4 Sheets-Sheet 2

INVENTOR:
Gerson H. Goldstick
By Louis A. Kline
John J. Mathlage
Murray L. Young
His Attorneys Dec. 31, 1963 G. H. GOLDSTICK 3,116,476

MEMORY SENSING SYSTEM

Filed Feb. 26, 1962 4 Sheets-Sheet 3

INVENTOR:
Gerson H. Goldstick
By Louis A. Kline
John J. Matlago
Maynard L. Young
His Attorneys Dec. 31, 1963 G. H. GOLDSTICK 3,116,476

MEMORY SENSING SYSTEM

Filed Feb. 26, 1962 4 Sheets-Sheet 4

INVENTOR:
Gerson H. Goldstick
By Louis A. Hine
John J. Matlago
Marvin L. Young
His Attorneys 3,116,476

MEMORY SENSING SYSTEM

Gerson H. Goldstick, Manhattan Beach, Calif., assignor to The National Cash Register Company, Dayton, Ohio, a corporation of Maryland Filed Feb. 26, 1962, Ser. No. 175,494
12 Claims. (Cl. 340—174)

This invention relates to a memory array sense amplifier and more specifically to an improved sense amplifier for adaptation to large memory arrays having short operating cycle times.

In the operation of a magnetic memory array the output signals therefrom not only will contain pulses representing the digits read out of the array but also will contain noise pulses caused by the read, write and enable signals which are employed to control the operation of the array. Furthermore, the output leads from the memory array, or more specifically, the respective terminals of the sense lines from the memory array will experience common voltage changes due to capacitive coupling between the sense line and other windings of the memory array. It is the purpose of the sense amplifier in a memory system to discriminate against the noise signals as well as also to accept, categorize and accurately reproduce the proper sense signals.

When the minimum difference in voltage between proper high and low signals received by the sense amplifier is sufficiently large, a direct coupled amplifier may be employed as a sense amplifier when its design has achieved good gain stability at high speeds. However, for the memory element of most memory arrays, the minimum difference in the output voltage thereof for high and low signals is such that an all direct coupled amplifier is not feasible. On the other hand, when A.-C. coupled amplifiers are employed to receive a sense signal, the time constant of the respective capacitive and inductive coupling elements must be sufficiently large so as to not distort the sensed signal and this in turn results in a lower frequency response of the amplifier system and places a limitation upon the memory repetition rates and the memory array cycle time for which the sense amplifier can be adapted.

In many situations, noise signals induced in the sense line will be many times greater than that of the proper sense signal to be received and amplified by the sense amplifier. This is particularly true when the sense line is coupled to a large number of memory elements in a large memory array which requires the limiting of the signals received on the sense line winding before presentation to the sense amplifier. However, such an arrangement of placing a signal limiter between the sense line and the amplifier reduces the input impedance to the amplifier and this results in undue loading of the memory elements. Various schemes have been devised to wind the sense line so as to cancel unwanted noise pulses. However, consideration must also be given to the ability of the amplifier to rapidly recover from having received a noise signal just before the proper sense signal since complete cancellation of noise signals in the sense windings is both difficult and impractical. That is to say, the amplifier may be driven by a noise signal much larger than the normal appropriate sense signal before the desired read signals have been supplied to the memory array which noise signals would overdrive the amplifier to the extent that there will not be sufficient recovery thereof in time for the amplifier to accept and accurately reproduce a proper sense signal. Because of the various cancelling schemes employed in winding the sense line in the memory array, the sense amplifier must be adapted to receive both positive and negative signals.

In order to decrease the magnitude of built up noise voltages and to decrease the time delay in transmitting a sensed signal from a given memory element to the sense amplifier, the present invention contemplates the replacement of the respective sense lines of a large memory array by a plurality of shorter sense lines which supply their respective signals to one of a plurality of preamplifiers all of which are coupled through a limiter to the main amplifier. To allow the amplifier to be operated during a shorter cycle time as well as to prevent a D.-C. bias shift of the signal supplied to the decision element of the present invention, a principal feature of this invention resides in a network having a large time constant to prevent signal distortion and in means to shorten this time constant prior to reception of a sense signal so as to permit the amplifier to recover from prior noise signals during a small time interval. Other features of the present invention reside in the manner in which bipolar pulses are amplified for the presentation of a unipolar output signal and the respective circuitry for strobing and achieving the other functions of a sensing system.

It is, then, a major object of this invention to provide an improved memory array sense amplifier for receiving, amplifying and categorizing proper sense signals and rejecting noise signals and common voltage excursions of the sense line of the memory array.

It is another object of this invention to provide an improved sense amplifier for a memory array which amplifier is capable of high frequency response and fast recovery from prior signals received from the memory array.

It is still another object of this invention to provide an improved sense amplifier for a memory array wherein the time delay for a sensed signal to be received has been minimized.

It is still a further object of this invention to provide an improved sense amplifier adapted for bipolar amplification and rectification of the respective sensed signals.

Other objects, advantages, and features of the present invention will become more apparent from a review of the following specification and claims when taken in conjunction with the drawings wherein:

As an example of the type of memory system with which the sense amplifier of the present invention may be employed, a memory array of elements such as cores or thin films may be formed wherein sets of respective elements are arranged in a linear-select word-oriented fashion. That is to say, a set of memory elements, for example, a row of such elements, are arranged to store a given word with each element storing a given bit of this word, each memory element of the set being associated with a common read-write drive line. Memory elements representing corresponding digits of respective words are associated with a common digit-enable drive line. The core or thin film elements are bistable devices which may be switched from one state to another by a current or coincident currents of sufficient magnitude to present magnetic fields that overcome the remanent magnetic state of the element. Such states are generally designated to represent a low and a high signal such as a "zero" and a "one" in a normal operation with destructive readout memories. Each of the respective memory elements will reside in the "zero" state unless changed to the "one" state during the write cycle such that, during the read cycle, the element will be switched back to "zero" thereby creating a pulse upon the sense winding representing a "one" while if the element is in the "zero" state it will not switch during the read cycle and no pulse will represent a "zero."

The arrangement of the memory array as contemplated by the present invention is one in which the read-write drives are biased in the read direction by one-third of the amount of the full select read current and the read signal is of a magnitude of two-thirds of the full select read current. The write signal constitutes a current in the write direction of two-thirds of the full select write current such that the element can be switched during the write cycle only when there is a coincidence of the write signal and the enable signal which has an equivalent magnitude of two-thirds of the full write select current. A complete memory array of the type just described is illustrated in the copending application of Gunderson et al., Serial No. 91,123, filed February 23, 1961, for a "Data-Storage System," which application and the present application have a common assignee.

Figure 1:
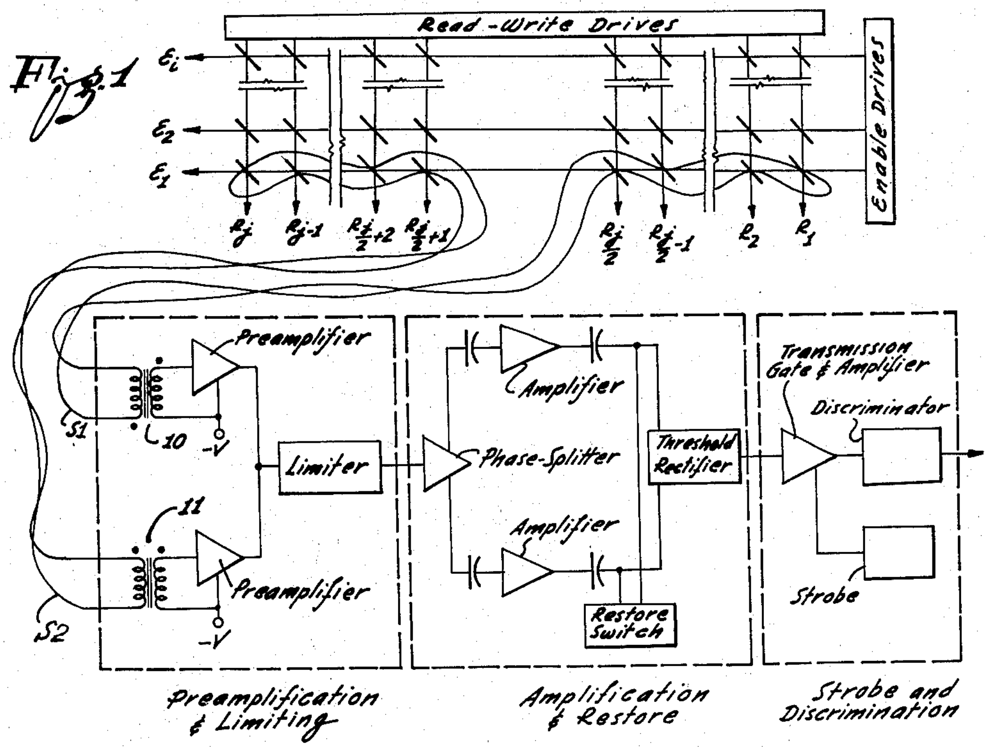
FIG. 1 is a schematic drawing illustrating the organization of the amplifier as well as the relation of the amplifier to the sense windings for a memory array and the manner in which the sense lines are wound.

To illustrate the type of memory array arrangement such as disclosed above and the type of problems associated therewith which are overcome by the present invention, reference is made to FIG. 1 in which a portion of the memory array is shown depicting the memory elements of three significant or like digits for the respective words of a word-oriented linear select memory. The memory array shown therein represents an arrangement of memory elements forming *j* number of words each of which has *i* number of digits. Each of the memory elements for a given word is coupled to a respective read-write drive line from the set of drive lines $R_1$–$R_j$ while the respective memory elements corresponding to a given significant bit of the respective words are coupled respectively to one of the digit enable drive lines $E_1$–$E_i$. As disclosed in the above referred to copending application, a sense amplifier and corresponding sense line are provided for each significant digit. That is to say, there is a separate sense line associated with each digit-enable drive line. As shown in FIG. 1 of the present application, the sense amplifier and corresponding sense lines are associated with the digit-enable drive line $E_1$ and it will be understood that similar sense amplifiers will be provided for each of the digit-enable drive lines $E_2$–$E_i$.

Figure 2:
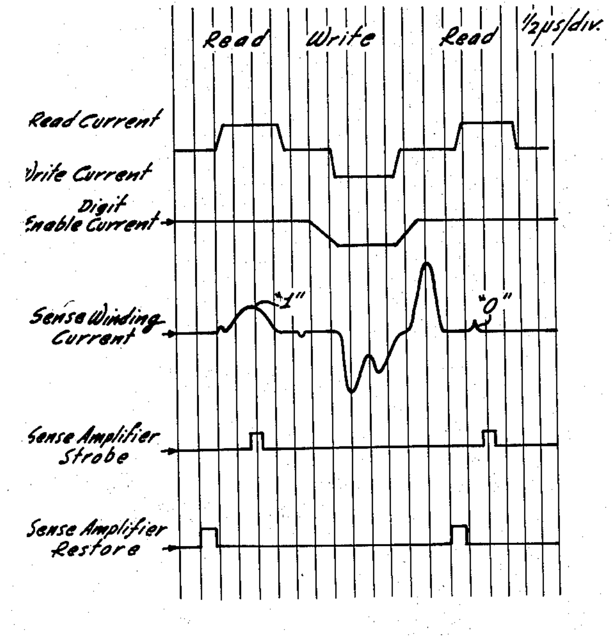
FIG. 2 is a timing diagram illustrating the various waveforms characteristic of the operation of the memory array.

Referring briefly to FIG. 2, there are shown therein the various waveforms for the respective windings in the memory array including: the read-write current as supplied to a selected one of the read-write drives $R_1$–$R_j$, the digit-enable current as supplied to selective ones of the digit-enable drive lines $E_1$–$E_i$, depending upon the digits to be stored in the memory array and a typical waveform as received by the respective sense windings. As illustrated in FIG. 2, a positive current on the read-write drives or digit-enable drives represents a current in the read direction and a negative current respectively represents a current in the write direction. It will be appreciated that, during the read-write cycle of the operation of the memory array, only one of the read-write drives $R_1$–$R_j$ will be selected for operation, this selection being made dependent upon the word address signal supplied to decoders, which are part of the memory system and supply signals to the read-write drives, although such decoders are not shown in FIG. 1. Similarly, each of the digit-enable drives $E_1$–$E_i$ will receive or not receive a digit-enable current depending upon the digits to be stored at a particular word address during a particular write portion of the read-write cycle. Since there is only one digit enable drive line associated with each sense amplifier, there will be little or no noise associated with enable signals supplied to the other digit-enable drive lines. However, it will be appreciated that while but one of the memory elements associated with the given sense line will receive a read-write signal during a given operation cycle, each of the cores associated with this sense line will receive a digit-enable pulse.

In FIG. 2 the waveform of the signal received on the sense line illustrates a proper high or "one" signal induced in the sense line when a memory element is switched from the "one" to the "zero" state during the read portion of the read-write cycle and also a proper low or "zero" signal induced in the sense line when the memory element is not switched, since it already resides in the "zero" state. However, during the write portion of the cycle there may be noise signals induced by the pulse supplied to the digit-enable line which noise signals may be many times that of the proper sense signals. This is especially true where there are many memory elements associated with a given sense line since the sense line is intimately coupled to its respective digit enable line at each of the respective memory elements. To reduce digit-enable noise, the sense line is wound through the respective memory elements in such a manner as to cancel noise pulses. That is to say, the sense line is wound through every other memory element in one particular direction and through the adjacent memory elements in the opposite direction. Such a scheme of canceling is illustrated in FIG. 1 for the sense line for memory elements on the read-write drive lines $R_1$–$R_{j/2}$ and also for the sense line for the memory elements on read-write drive lines $R_{(j/2)+1}$–$R_j$. Perfect cancellation is not achieved, however, because of the lack of uniformity in the respective memory elements and as the number of memory elements on the digit-enable line increases, the noise voltage increases. Thus for large memories, additional canceling schemes must be found.

To further reduce the digit-enable noise, the present invention departs from prior art systems in that the memory elements associated with a given digit enable line are divided into groups or subgroups each of which is supplied with its own sense line. As shown in FIG. 1, the memory elements associated with the digit-enable drive line $E_1$ are divided into two groups and the corresponding sense lines S1 and S2 are so coupled to the preamplifiers of the sensing system that noise signals on the respective sense lines will oppose one another for further cancellation of digit-enable noise. It will be appreciated that this further canceling scheme will not affect the readout of the proper sense signals since, during a given read-write cycle, no more than one of the memory elements on both of sense lines S1 and S2 will have been switched. It will be further appreciated that when a number of memory elements associated with a given digit-enable line is extremely large, these particular memory elements can be divided into even smaller groups and appropriate sense lines provided with the same canceling scheme as described above.

In addition to inductive coupling between the sense line and the digit-enable line, capacitive coupling results in large common mode voltage excursions along the entire sense winding which voltage excursions must be rejected by the sense amplifier. With a properly arranged sense winding wherein the capacitive coupling between the sense winding and the digit-enable winding is approximately the same in both directions, that is where alternate memory elements are wound in an opposite manner, the voltage excursions arising from such a capacitive coupling should be the same at each of the sense line terminals and the desired signal to be sensed is the voltage difference across the terminals. To achieve common mode rejection the respective sense lines are coupled to the sense amplifier by transformers 10 and 11 respectively such that only voltage differences across the primaries thereof are transmitted to the respective preamplifiers and then to the limiter circuitry. The polarities of the windings of respective transformers 10 and 11 are indicated to be opposite of one another to illustrate the canceling scheme for a large number of memory elements associated with the given digit-enable drive lines as mentioned above.

Figure 3:
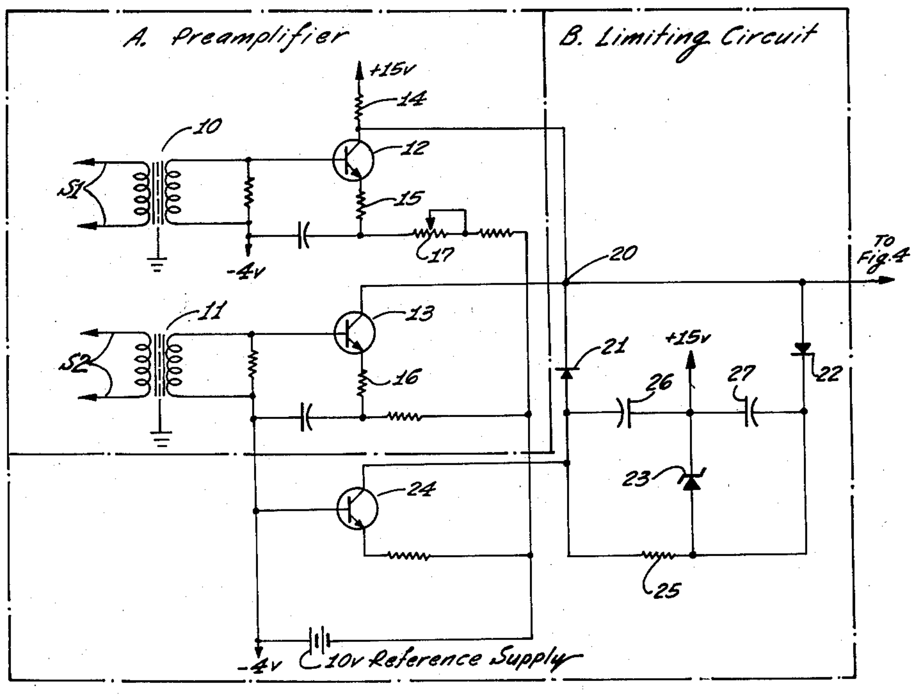
FIG. 3 is a specific embodiment of the preamplification and limiting circuitry.

While the methods of winding the memory elements described above are designed to reduce enable noise, such noise will still exist to a lesser degree and, if allowed to pass through the entire amplifier undiminished, latter portions of the amplifier may be blocked and a subsequent signal occurring shortly thereafter may become distorted. Thus, it is the practice to provide a limiting circuitry between the sense line and the amplifier to prevent excessive noise pulses from reaching and disturbing the amplifier. However, signal limiting cannot be accomplished at the sense winding because of the requirements placed on the amplifier input impedance which if reduced results in loading of the memory elements. With a plurality of sense lines each having a separate preamplifier, the limiting circuitry can be inserted between the preamplifier and the main amplifier as illustrated in FIG. 1 where the preamplifiers are such as to be able to accept enable noise without signal distortion. The specific embodiment of the preamplifiers and limiting circuitry is shown in FIG. 3 and the advantage thereof will be more specifically described in relation thereto.

Because of the manner in which respective memory elements of the memory array are wound such that one element will induce a positive output pulse in the sense line while an adjacent element will induce a negative output pulse in a sense line, it is required that the sense amplifier be able to accept bipolar pulses and reproduce a unipolar output pulse. As described thus far, the preamplification and limiting circuitry will accept bipolar pulses from the respective sense lines with the limiting circuitry being adapted to limit the amplitude of both positive and negative pulses. To rectify and amplify these bipolar pulses without undue distortion, the present invention contemplates the provision of a phase splitter to provide both a positive and negative phase for each incoming pulse received and dual amplification of the respective phases for presentation thereof through a diode-summing network to a threshold rectifier such that only amplified positive pulses are presented to the discriminator.

Figure 4:
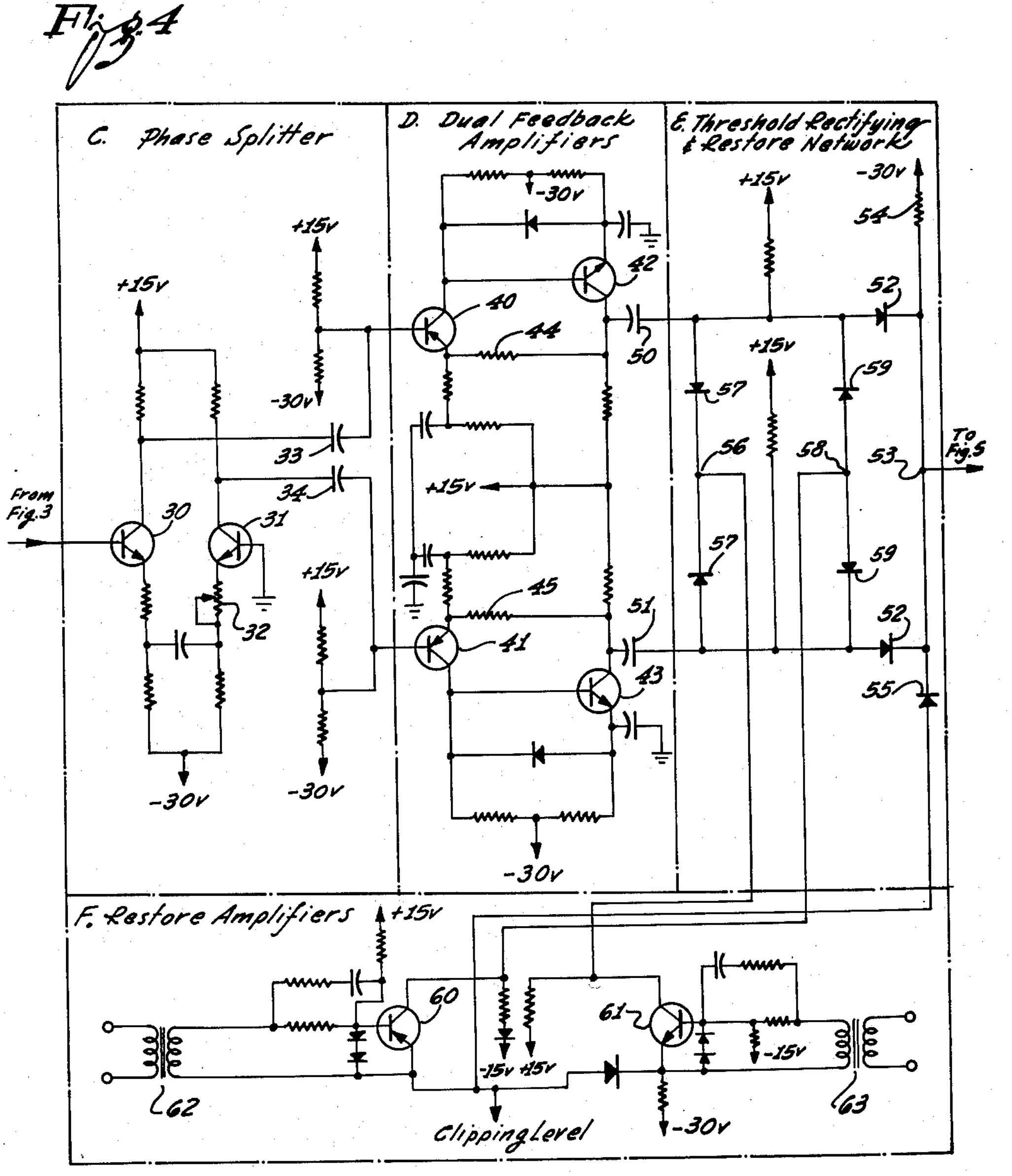
FIG. 4 is a specific embodiment of the main amplifier and restoration circuitry.

In order to prevent the output pulse of the amplifier from being pattern sensitive and also to insure that the amplifier may be quickly recovered from prior noise signals before receiving a sense signal, the amplifier should be designed to have a small time constant for the coupling circuit between the amplifier and threshold circuits. However, it is required that the circuitry have a large time constant relative to the width of the received pulses in order to insure minimization of any distortions of the pulse due to the transient overshooting or undershooting during the pulse build up and decay. While the amplifiers may be inductively coupled to the rectifier and threshold circuits, with recovery being accelerated by supplying signals at a very high impedance and opening the load circuit during the recovery interval, this approach can result in high voltage oscillations of the amplifier and high power dissipation. On the other hand, where there is capacitive coupling between the amplifier and threshold circuitry, recovery can be accelerated by the presentation of a low impedance to the capacitor. Thus, to provide a coupling network between the amplifier and the threshold circuitry of the sense amplifier of FIG. 1, capacitive coupling is employed and restoration prior to the reception of proper sense signal is obtained by shorting out the coupling network, and allowing it to discharge through the output impedance of the amplifier. The amplifiers and coupling networks as well as the threshold rectifying circuitry and restore source are illustrated in FIG. 4 which will be more specifically described in detail.

Figure 5:
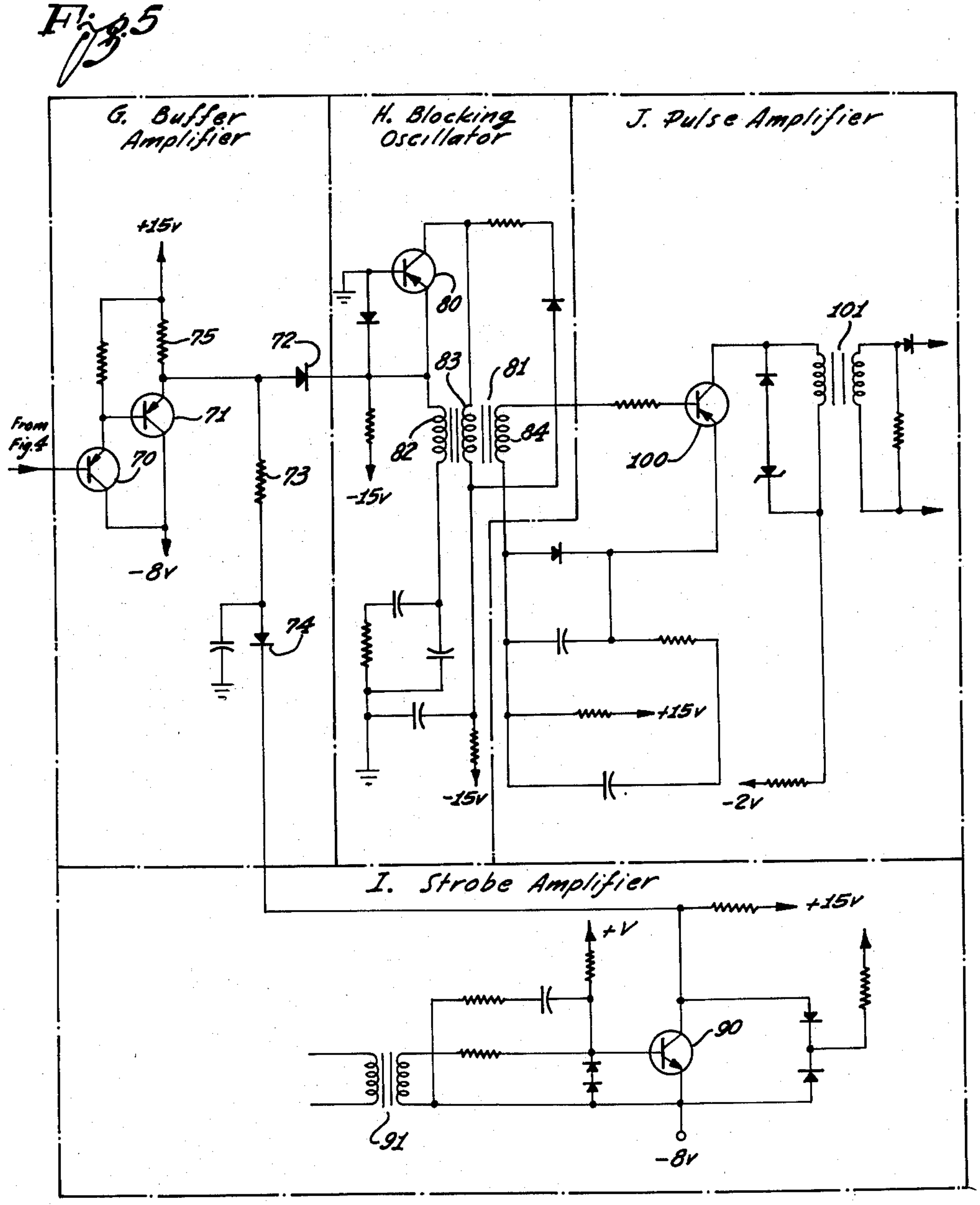
FIG. 5 is a specific embodiment of the strobing and discrimination circuitry as well as circuitry for additional amplification.

After rectification of bipolar pulses by phase splitting and employment of the diode-summing network, the resultant unipolar signal is then presented to the decision element which is a sensitive voltage comparator that is isolated from the amplifier by a transmission gate. The transmission gate employed in the present invention is a buffer amplifier the output terminal of which is biased to a negative voltage source except during a sampling or strobe interval. This completion of the sense amplifier circuitry is indicated generally in FIG. 1 and the specific embodiments for the transmission gate (a buffer amplifier), the strobe circuit and the discrimination element (a blocking oscillator) are illustrated in FIG. 5 which will be more specifically described in detail. The sense amplifier restore pulses and sense amplifier strobe pulses are illustrated in FIG. 2 in relation to the sense signals as received from the sense windings during the respective portions of the read-write cycle on the memory array.

Specific embodiments of the respective stages of the sense amplifier of the present invention will now be described in reference to FIGS. 3, 4, and 5.

As shown in block A of FIG. 3, the sense lines S1 and S2 are respectively coupled to the primary windings of transformers 10 and 11. The signals induced on secondary windings thereof are supplied respectively to the base of NPN transistor 12 and the base of NPN transistor 13. While the polarity of the windings of transformers 10 and 11 have not been illustrated in FIG. 3, it will be remembered that the sense lines S1 and S2 are wound in such a manner that noise signals on the respective sense lines are of opposing phases at junction 20 of the limiting circuit. While the transformer inductances are chosen so as to achieve low frequency response, the transformer coupling capacities are minimized so as to achieve maximum rejection of common voltage excursions on the respective sense lines. The values of resistors 14, 15, and 16 are chosen in accordance with the input impedance and the frequency response requirements of the preamplifiers and the initial collector voltages of transistors 12 and 13 are set by means of potentiometer 17.

The preamplifiers amplify the memory element outputs to a level which permits reliable clipping to be accomplished at the collectors of the respective preamplifier transistors. In the limiting circuit of block B, the voltage, developed at the preamplifier collectors, is restricted by clamping diodes 21 and 22 which are connected to a relative negative voltage level and to a relative positive voltage level, respectively. The limiting voltages are implemented by means of a temperature stable Zener diode indicated generally at 23 the bias circuit for which includes NPN transistor 24, the bias circuit being completed from the collector of transistor 24 through resistor 25 and Zener diode 23 to a positive 15 volt supply. This circuit serves to bias Zener diode 23 to breakdown so that the constant voltage across resistor 25 is imposed across the series of capacitors 26 and 27 the common junction of which is referenced to the positive 15 volt supply.

After limiting, the respective signals are transmitted to the main amplification circuitry which will now be described in reference to FIG. 4. As indicated above, the main amplification circuitry must receive bipolar pulses for amplification and rectification to achieve a unipolar output signal with a minimum distortion. The incoming bipolar pulse is first supplied to a phase splitter with each phase being amplified separately and supplied to a diode summing network. As shown in block C of FIG. 4, the incoming signal from the preamplifiers and limiting circuitry of FIG. 3 is received at the base of NPN transistor 30 which together with NPN transistor 31 forms a differential amplifier. Potentiometer 32 is provided to establish the gain of the amplifier. Thus, when a positive signal is impressed upon the collector-emitter circuit of transistor 30, the change in the collector-emitter current thereof will correspond to an opposite change in the collector-emitter current of transistor 31, the base of which is biased to ground. That is to say, a positive change in the collector voltage of transistor 30 will be produced in concurrence with a negative change of the collector voltage of transistor 31. The collectors of transistors 30 and 31 are coupled to dual feedback amplifiers through capacitors 33 and 34, respectively.

Because of the short recovery time requirement on the output coupling network, the main amplification system is chosen to be of a series-shunt feedback configuration which exhibits a low output impedance as shown in block D of FIG. 4. Respective signals from the phase splitter of block C are supplied to the base electrodes of the respective PNP transistors 40 and 41 the collectors of which are directly coupled to the base electrodes of respective NPN transistors 42 and 43. Feedback resistors 44 and 45 couple the collectors of transistors 42 and 43 respectively to the emitters of transistors 40 and 41 with the collector outputs of transistors 42 and 43 being coupled to a threshold rectifying network through capacitors 50 and 51.

After amplification, the respective phase signals are summed through diodes 52, in block E of FIG. 4, to junction 53 which is coupled through diode 55 to the voltage level at which the amplified signals are to be clipped. The phase splitter of block C, the feedback amplifiers of block D and the summing diodes of block E are then analogous to a full wave rectifier.

As previously mentioned, the sense signal to be accepted and amplified for presentation to the discrimination element will appear shortly after digit-enable noise which may cause considerable D.C. level shift at the coupling capacitors 50 and 51, the values of which are so chosen as to pass low frequency components of the signal. Thus, to prevent such a voltage shift, the capacitors must be re-referenced to the clipping level voltage just prior to the occurrence of the read signal so that the previous history of the sense amplifier will not affect discrimination. As contemplated in the present invention, referencing of the coupling capacitors 50 and 51 is accomplished by shorting one side of the capacitors to the clipping level voltage by way of restore switches so as to allow the capacitors to discharge through the output impedance of the feedback amplifiers. It will be appreciated that the respective read signals and enable noise, as amplified by the dual feedback amplifiers, have not been rectified and thus, coupling capacitors 50 and 51 may reside, just prior to the read signal, in either a high or a low state relative to the clipping level at the time they are to be discharged or restored.

Referring now to block F of FIG. 4 which illustrates the restore amplifiers, PNP transistor 60 and NPN transistor 61 couple capacitors 50 and 51 to the precise levels to which the capacitors are to be biased. The collector of transistor 60 is connected to junction 58 of the restore network and through diodes 59 to capacitors 50 and 51. The collector of transistor 61 is similarly connected to junction 56 of the restore network and through diodes 57 to capacitors 50 and 51. The purpose of the respective diodes 57 and 59 is to isolate either of transistors 60 and 61 from coupling capacitors 50 and 51 when that capacitor resides at a voltage level different from that from which the particular transistor restores.

Both the transistors 60 and 61 are operated in an on-off manner with the respective transistors being rendered conductive by restore signals from outside of the sense amplifier which signals are received through transformers 62 and 63 are imposed across the base and emitter of the respective transistors. Since the output impedance of the feedback amplifiers is no more than 200 ohms, the discharge RC time constant is approximately 0.1 microsecond which allows the restore pulse, of approximately 0.3 microsecond in duration, to be timed to occur after a noise pulse but before read signal pulse.

After the signal pulse has been rectified it is supplied through the buffer amplifier of block G of FIG. 5 to the decision element. The buffer amplifier serves to isolate the feedback amplifiers from the strobing circuitry and is a double emitter follower comprised of PNP transistors 70 and 71. The signal as received from junction 53 of the threshold rectifying network is impressed upon the base of transistor 70 the emitter of which is coupled to the base of transistor 71 with the amplified signal being taken off the emitter thereof.

During the strobe interval, this signal is supplied through diode 72 to the discrimination element which is a blocking oscillator as shown in block H of FIG. 5. The strobe amplifier consists of NPN transistor 90 the emitter of which is clamped to a minus 8 volt supply. The base of transistor 90 is biased to a voltage of a magnitude such that transistor 90 is normally maintained in saturation with the result that the emitter of transistor 71 in block G of FIG. 5 is normally shorted through resistor 73 and diode 74 to the minus 8 volt supply. If either a positive or a negative voltage appears on the sense line, an amplified and rectified signal acts to reverse-bias clipping diode 55 of block E in FIG. 4 and, if no stroke signal is present, the emitter of PNP transistor 71 is clamped to the minus 8 volt supply and transistor 71 is reverse-biased. When a strobe signal is impressed on the base of NPN transistor 90 of the strobe amplifier which is coupled through transformer 91 to a strobe pulse source (not shown), transistor 90 is cut off and the emitter of transistor 71 rises to its base voltage. Under these conditions, if the signal amplitude and the clipping voltage level are such that diode 72 is forward biased, the then occurring pulse is transmitted from the positive 15 volt supply of block G and resistor 75 to the decision element of block H. Resistor 75 is so designed as to supply a signal having an amplitude sufficient to trigger the blocking oscillator during the strobe interval. If a "zero" pulse is being sensed when the strobe occurs, there will be a current flow from the base of transistor 70 in block G of FIG. 5 through resistor 54 of block E in FIG. 4 to a minus 30 volt supply which current will be of sufficiently small magnitude such that no appreciable signal is developed in the base of transistor 70.

As shown in block H of FIG. 5, the decision element is a one-shot blocking oscillator wherein the base of PNP transistor 80 is grounded and the emitter is connected through primary winding 82 of transformer 81. The inductance of winding 82 determines the width of the output signal of the sensing system. The regenerative circuit is from the collector of transistor 80 through secondary winding 83 of transformer 81. The output of this blocking oscillator is taken off secondary winding 84 of transformer 81 and supplied to the pulse amplifier of block J. The pulse amplifier includes PNP transistor 100 the collector of which drives the primary of output transformer 101 with the amplified unipolar sense output signals from the secondary thereof being just the required amplified sense signal that may then be supplied to a memory flip-flop.

That an A.C. coupled amplifier of the present invention can be employed in a sensing system for a high speed memory array is made possible by the particular manner in which the coupling circuitry between the amplifier and the discriminator element is restored prior to the reception of the sense signal so as to minimize the response time. Although the coupling stages existing before the amplifier are not restored and experience D.-C. level shifts, it is only the amplified signal as presented to the discrimination element which must be free of such voltage shifts. In order that the overall low frequency response of the sensing system is not affected by the time constant of the input network that includes the sense line, the isolation transformer, and the amplifier input impedance, it is required that the input impedance be sufficiently high so as to provide small $L/R$ time constant for the input network.

Before presentation to the decision element, the amplified sense signal is established on a D.-C. bias voltage or clipping level, and the sum of the clipping voltage and the sense signal is compared with the threshold voltage of the decision element, that is, that voltage magnitude required to trigger the decision element. With a blocking oscillator as employed in the present invention and the coupling network between the amplifier and the decision element, including the transmission gate and strobe circuitry, the region of uncertainty above which a signal will definitely trigger the decision element and below which a signal definitely will not trigger the decision element, is negligible and, thus, extremely good reliability of the discrimination circuit is obtained.

This sensing system is applicable to the newer and faster components such as thin films and other memory elements which are currently being developed. When shorter memory cycle times are employed with a proportional reduction of the read and write times thereof, the available restore and strobe times must also be reduced and the sensing system of the present invention can accommodate such time reductions. When the strobe interval is shortened as required in the shorter operating cycles, any delay of the sense signal due to the amplifier or the sense windings must also be reduced since any large variation of the delay time in comparison with the strobe pulse width would negate the effectiveness of the strobing system. Variations of such time delays are minimized in the present system by the manner in which the sense lines are wound and the particular circuitry described herein.

As described herein, the sensing system of the present invention is characterized by good gain stability and that frequency response and dynamic range as required for large memory array. For example, the memory array as shown generally in FIG. 1 may be a ten thousand word memory of thirteen bits to a word. However, it will be appreciated that the sense amplifier of the present invention can be adapted to larger memories with corresponding modifications as before discussed. As illustrated in FIG. 2 this memory, employing ferrite cores, may be operated with a read-write cycle of 6 microseconds or less.

While the form of the invention shown and described herein is adapted to fulfill the objects primarily stated, it will be understood that it is not desired to limit the invention to the specific embodiments described and changes and modifications will, of course, be evident to those skilled in the art.

What is claimed is:

1. A sensing system for an array of magnetic memory elements, said system comprising: first circuit means to receive a signal from one of a plurality of said memory elements; amplifier means coupled to said first circuit means to amplify said signal; discriminator means to categorize said signals according to the amplitudes thereof; second circuit means to connect said amplifier means to said discriminator means, said second circuit means including coupling elements characterized by a relatively low frequency response so as not to distort said signals; and switching means connected to said second circuit means and effective to periodically increase the frequency response of the coupling elements prior to each reception of one of said signals.

2. A sensing system according to claim 1 including capacitive means as the coupling elements of said second circuit means.

3. A sensing system for an array of magnetic memory elements, said system comprising: first circuit means to receive an output signal from one of a plurality of said memory elements; amplifier means coupled to said first circuit means to amplify said signals; discriminator means to categorize said signals according to the amplitudes thereof; second circuit means adapted to connect said amplifier means to said discriminator means, said second circuit means being characterized by a large time constant so as not to distort said signals and including capacitive means biased to a given voltage threshold level; and switching means connected to said second circuit means and effective to periodically re-reference said capacitive means to said voltage level prior to each reception of one of said signals.

4. A sensing system according to claim 3 wherein said switching means includes third circuit means to periodically connect said capacitive means to a voltage level source.

5. A sensing system for an array of magnetic memory elements, said system comprising: first circuit means to receive bipolar output signals from said memory elements; amplification means coupled to said first circuit means and including a phase-splitter to generate both a positive and a negative phase signal for each positive or negative phase signal received and means to amplify each generated phase signal; a diode summing network to receive said respective amplified phase signals for presentation of unipolar signals; discriminator means to receive said unipolar signals for categorization according to the amplitudes thereof; second circuit means connecting said amplification means through said diode summing network to said discriminator means, said second circuit means being characterized by a low frequency response so as not to distort said signals; and switching means connected to said second circuit means and effective to periodically increase the frequency response thereof prior to each reception of one of the said signals.

6. A sensing system according to claim 5 wherein said second circuit means includes capacitive means biased to a given threshold voltage level and is adapted to receive positive and negative amplified phase signals; said switching means being adapted to periodically re-reference said capacitive means to said voltage level before each reception of one of said signals.

7. A sensing system for an array of magnetic memory elements each of which is coupled to a singular combination of one of a plurality of digit-enable drive lines and one of a plurality of read-write drive lines, said system comprising: first circuit means including a plurality of sense lines each coupled to a separate group of memory elements on a given enable drive line; a plurality of preamplifier means, each adapted to receive signals from a separate one of said sense lines; limiting circuitry coupled to said plurality of preamplifier means to receive and limit the amplitudes of said signals; amplification means to receive and amplify said limited signals; discriminator means to categorize said signals according to the amplitudes thereof; second circuit means connecting said amplification means to said discriminator means, said second circuit means being characterized by a low frequency response so as not to distort said signals; and switching means connected to said second circuit means and effective to periodically increase the frequency response thereof prior to each reception of one of said signals.

8. A sensing system for an array of magnetic memory elements each of which is coupled to a singular combination of one of a plurality of digit-enable drive lines and one of a plurality of read-write drive lines, said system comprising: first circuit means including a plurality of sense lines each coupled to a separate group of memory elements on a given enable drive line; a plurality of preamplifier means, each adapted to receive signals from a separate one of said sense lines; limiting circuitry coupled to said plurality of preamplifier means to receive and limit the amplitudes of said signals; amplification means to receive and amplify said limited signals; discriminator means to categorize said signals according to the amplitudes thereof; second circuit means connecting said amplification means to said discriminator means, said second circuit means being characterized by a low frequency response so as not to distort said signals and including capacitive means as coupling elements of said second circuit means; and switching means connected to said second circuit means and effective to periodically increase the frequency response thereof prior to each reception of one of said signals.

9. A sensing system for an array of magnetic memory elements each of which is coupled to a singular combination of one of a first set of drive lines and one of a second set of drive lines, said system comprising: first circuit means including a plurality of sense lines each coupled to a separate group of memory elements on a given one of said first set of drive lines; a plurality of preamplifier means each adapted to receive signals from a separate one of said sense lines; limiting circuitry coupled to said plurality of preamplifier means to receive and limit the amplitudes of said signals; amplifier means to receive and amplify said limited signals; discriminator means to categorize said signals according to the amplitudes thereof; second circuit means adapted to connect said amplifier means to said discriminator means, said second circuit means being characterized by a large time constant so as not to distort said signals and including capacitive means biased to a given voltage threshold level; and switching means connected to said second circuit means and effective to periodically re-reference said capacitive means to said voltage level prior to each reception of one of said signals.

10. A sensing system for an array of magnetic memory elements each of which is coupled to a singular combination of one of a first set of drive lines and one of a second set of drive lines, said system comprising: first circuit means including a plurality of sense lines each coupled to a separate group of memory elements on a given one of said first set of drive lines; a plurality of preamplifier means each adapted to receive signals from a separate one of said sense lines; limiting circuitry coupled to said plurality of preamplifier means to receive and limit the amplitudes of said signals; amplifier means to receive and amplify said limited signals; discriminator means to categorize said signals according to the amplitudes thereof; second circuit means adapted to connect said amplifier means to said discriminator means, said second circuit means being characterized by a large time constant so as not to distort said signals and including capacitive means biased to a given voltage threshold level; and switching means connected to said second circuit means and effective to periodically re-reference said capacitive means to said voltage level prior to each reception of one of said signals, said switching means including third circuit means to periodically connect said capacitive means to a voltage level source.

11. A sensing system for an array of magnetic memory elements, said system comprising: first circuit means including a plurality of sense lines each coupled to a separate group of memory elements; a plurality of preamplifier means, each adapted to receive signals from a separate one of said sense lines; limiting circuitry coupled to said plurality of preamplifier means to receive and limit the amplitudes of said signals; amplification means coupled to said limiting circuitry and including a phase-splitter to generate both a positive and a negative phase signal for each positive or negative phase signal received and means to amplify each generated phase signal; a diode summing network to receive said respective amplified phase signals for presentation of unipolar signals; discriminator means to receive said unipolar signals for categorization according to the amplitudes thereof; second circuit means connecting said amplification means through said diode summing network to said discriminator means, said second circuit means being characterized by a low frequency response so as not to distort said signals; and switching means connected to said second circuit means and effective to periodically increase the frequency response thereof prior to each reception of one of the said signals.

12. A sensing system for an array of magnetic memory elements, said system comprising: first circuit means including a plurality of sense lines each coupled to a separate group of memory elements; a plurality of preamplifier means, each adapted to receive signals from a separate one of said sense lines; limiting circuitry coupled to said plurality of preamplifier means to receive and limit the amplitudes of said signals; amplification means coupled to said limiting circuitry and including a phase-splitter to generate both a positive and a negative phase signal for each positive or negative phase signal received and means to amplify each generated phase signal; a diode summing network to receive said respective amplified phase signals for presentation of unipolar signals; discriminator means to receive said unipolar signals for categorization according to the amplitudes thereof; second circuit means connecting said amplification means through said diode summing network to said discriminator means, said second circuit means being characterized by a low frequency response so as not to distort said signals; and switching means connected to said second circuit means and effective to periodically increase the frequency response thereof prior to each reception of one of the said signals; said second circuit means including capacitive means biased to a given threshold voltage level and adapted to receive positive and negative amplified phase signals and said switching means being adapted to periodically re-reference said capacitive means to said voltage level before each reception of one of said signals.

No references cited.